Aug. 8, 1939.    C. E. BENNETT    2,168,858
ELECTRIC CABLE SYSTEM
Original Filed June 8, 1934    2 Sheets-Sheet 1
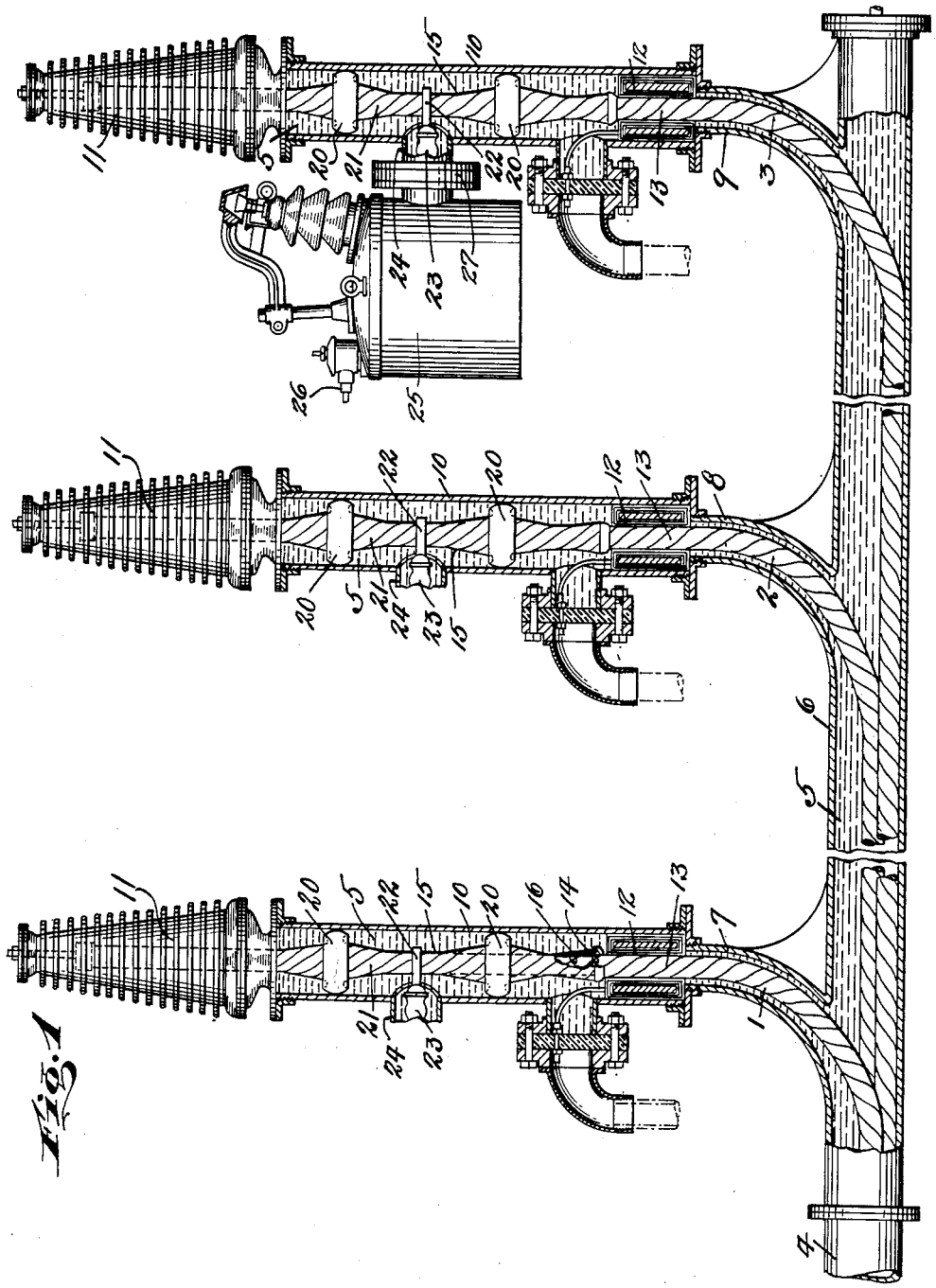
INVENTOR
Charles E. Bennett.
BY
Kiddle, Bethell and Montgomery.
ATTORNEYS.

Aug. 8, 1939.   C. E. BENNETT   2,168,858
ELECTRIC CABLE SYSTEM
Original Filed June 8, 1934   2 Sheets—Sheet 2
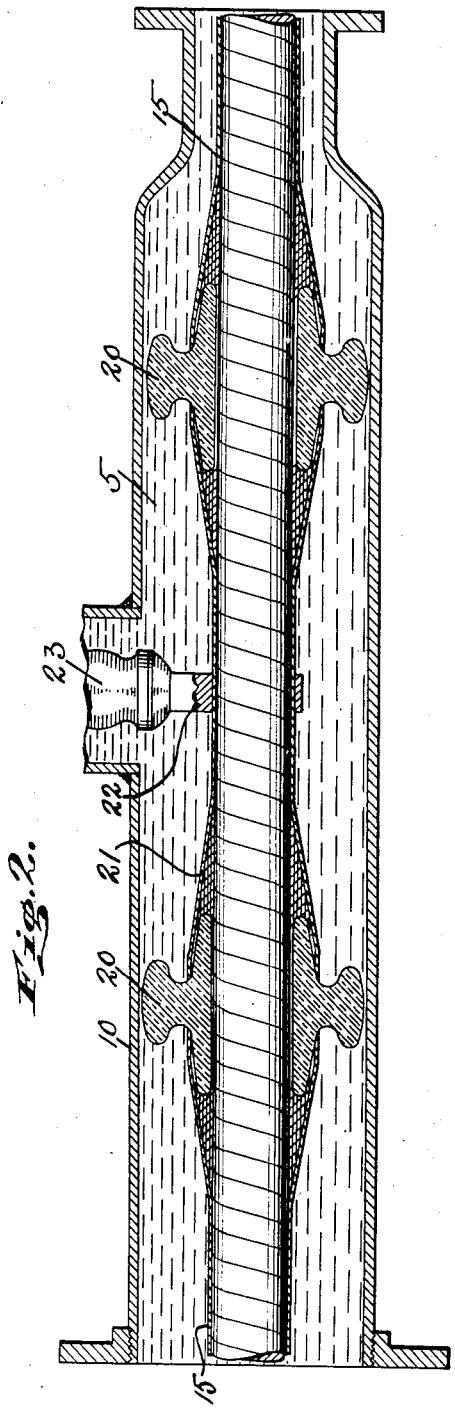
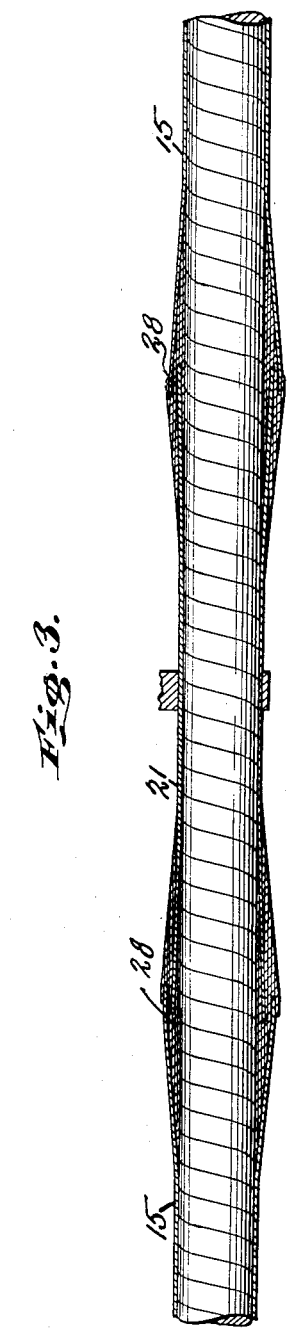
INVENTOR
Charles E. Bennett
BY
Liddle, Bushell and Montgomery
ATTORNEYS Patented Aug. 8, 1939

2,168,858

UNITED STATES PATENT OFFICE 2,168,858

ELECTRIC CABLE SYSTEM

Charles E. Bennett, Ridgewood, N. J., assignor to The Okonite-Callender Cable Company, Incorporated, Paterson, N. J., a corporation of New Jersey Original application June 8, 1934, Serial No. 729,607. Divided and this application September 17, 1936, Serial No. 101,244

4 Claims. (Cl. 171—97)

This invention relates to cable systems of the type in which the insulated unsheathed cable conductors are enclosed in a pipe filled with oil maintained under high pressure, say, for example, 200 pounds to the square inch, but in any event under sufficiently high pressure to increase the dielectric strength of the oil, and has for one of its objects the provision in such a system of coupling condensers adapted to be connected to instruments or other burden.

A further object of my invention is the provision of a construction which is relatively inexpensive as compared with prior systems and very compact so as to require only the minimum of space for installation.

This application is a division of my copending application Serial No. 729,607, filed June 8, 1934.

In the drawings accompanying this application:

Fig. 1 is a part sectional elevational view showing an embodiment of my invention;

Fig. 2 is a sectional elevational view of the structure providing the condenser coupling shown on a smaller scale in Fig. 1; and Fig. 3 is a modification of the structure of Fig. 2.

Referring to the drawings in detail, the insulated unsheathed conductors 1, 2 and 3 of a three phase cable construction are enclosed in a pipe line 4 of steel, iron or other suitable material which is capable of containing oil 5 under high pressure, say, for example, 200 pounds to the square inch or even higher.

Secured to the pipe line 4 is a terminal manifold 6 constituting in effect a continuation of the pipe line. This manifold is equipped with outlet pipes 7, 8 and 9 which may conveniently be integral with the manifold 6. An outlet pipe is provided for each cable conductor, as will be apparent from the drawings.

A riser, designated 10, is sealed liquid-tight to the outer end of each of the outlet pipes 7, 8 and 9. To the outer end of each of the risers is sealed an insulator 11, each of the cables 1, 2 and 3 extending through an outlet pipe, riser and into the insulator. The outlet pipes, risers and insulators are in communication with the pipe line 4 so that it will be appreciated each cable to its outer end is immersed in oil under high pressure.

Each of the cables 1, 2 and 3 is provided with shielding tape designated 13. Within each riser 10 and submerged in the oil therein is a current transformer 12, each insulated shielded cable passing through the transformer.

In each instance the shielding tape 13 is discontinued a short distance above the top of each transformer, as shown at 14. The tape about the remainder of the cable and which has been designated 15 is separated from the tape 13 by several layers of varnished cambric 16 or other suitable material.

As above mentioned, one of the objects of the present invention is to provide coupling condensers in the cable terminals thereby to obtain a very compact and inexpensive construction which eliminates the expense incident to prior structures where condensers of different capacities must be purchased for different installations, the present construction being such as to provide for any desired capacity in the device itself. More specifically, I propose to employ the conductor of the power cable as one plate of a condenser, the shielding tape 15 functioning as the other plate. It will be quite evident that by varying the effective length of this shielding tape any desired capacity can be obtained.

It will be found upon reference to Fig. 2 that the shielding tape 15 for each conductor is split into sections which are insulated from each other by insulators 20, thereby providing a short length 21 of shielding tape within the terminal riser insulated from the cable conductor and as above explained from the remainder of the shielding tape as well as from the risers 10. This short length of shielding tape constitutes one plate of my condenser, the other plate, as above mentioned, being provided by the conductor of the cable itself. Obviously by varying the length of the shielding section or condenser plate 21 the capacity of the condenser may be varied to any extent desired. This is of economical and practical advantage as compared with prior structures where it is necessary to purchase and install a separate condenser where condensers of different capacities are desired.

About the sheath length or condenser plate 21 I provide a connector 22 which passes through an insulator 23 in an outlet 24 from each of the risers 10 to the transformer which is shown diagrammatically at 25. This transformer is of standard construction in instrument work such as for synchronizing and potential indicators. The leads from the transformer 25 to any burden are shown at 26.

The transformer 25 is enclosed in oil but it is not necessary that this oil be maintained under the pressure at which the oil in the cable is maintained, the disc 27 shown in the connection between the transformer and the riser 10 being in the nature of a barrier disc.

In Fig. 3 I have shown a modification of the construction of Fig. 2. In this figure the shielding length or plate 21 is insulated from the rest of the shielding of the cable by employing insulating tape 28 as the insulating means, as distinguished from the insulators 20 of Fig. 2.

Prior to this invention it has been customary to employ special capacity couplings connecting the special transformer 25 with the high voltage line. Such apparatus, however, is capable of only delivering very small quantities of power, in the neighborhood, for example, of 60 volt-amperes, while in my construction any amount of power within reason may be delivered, in the neighborhood of ten times that just mentioned, for example. My construction has an additional advantage in that the size of the cable bushing is not increased nor is any additional room necessary.

It will be understood that changes may be made in the details of the construction above described within the purview of this invention.

What I claim is:

1. In a cable system, the combination of a pipe line, an insulated cable conductor disposed therein, metallic shielding tape about the cable insulation, a terminal structure for the cable comprising a pipe freely communicating with said pipe line, oil under pressure filling the pipe line and terminal structure and in which the cable is submerged, and means for insulating a length of the shielding tape from the terminal structure and from the remainder of the tape thereby to provide a condenser, with the insulated length of shielding tape constituting one plate of the condenser and the cable conductor the other plate.

2. In a cable system, the combination of an insulated cable conductor, metallic shielding tape about the cable insulation, an enclosure for the cable, means for insulating a portion of the metallic shielding tape from the remainder of the system, a transformer external to the cable enclosure electrically connected for energization to the insulated portion of the shielding tape.

3. In a cable system, the combination of an insulated cable conductor, grounded metallic shielding tape about the cable insulation, an enclosure for the cable, means for insulating a portion of the shielding tape from the remainder of the system, a transformer external to the cable enclosure, and an electrical connection from the insulated portion of the shielding tape to one winding of the transformer, thereby to provide a coupling condenser for supplying energy to the transformer, the conductor of the cable functioning as one element of the condenser, the insulated sheath section as the other condenser element.

4. In a cable system, the combination of a pipe line, an insulated cable conductor loosely disposed therein, shielding tape about the insulated conductor, means for electrically insulating a length of the shielding tape from the remainder of the tape and from ground, oil under pressure filling the pipe line in which the cable conductor and its shielding tape are submerged, and a transformer external to the pipe line electrically connected to the condenser provided by the insulated conductor and the insulated sheath length.

CHARLES E. BENNETT.